(12) United States Patent
Kelleher

(10) Patent No.: US 7,033,636 B2
(45) Date of Patent: *Apr. 25, 2006

(54) LOW CHOLESTEROL, FUNCTIONAL, ANIMAL MUSCLE PROTEIN COMPOSITION AND PROCESS

(75) Inventor: Stephen D. Kelleher, Wakefield, MA (US)

(73) Assignee: Proteus Industries, Inc., Gloucester, MA (US)

( * ) Notice: Subject to any disclaimer, the term of this patent is extended or adjusted under 35 U.S.C. 154(b) by 49 days.

This patent is subject to a terminal disclaimer.

(21) Appl. No.: 10/827,646

(22) Filed: Apr. 19, 2004

(65) Prior Publication Data

US 2004/0224079 A1 Nov. 11, 2004

Related U.S. Application Data

(60) Provisional application No. 60/464,614, filed on Apr. 23, 2003.

(51) Int. Cl.
*A23J 3/04* (2006.01)

(52) U.S. Cl. .............. 426/657; 426/646; 426/641; 426/643; 426/644

(58) Field of Classification Search ........... 426/646, 426/641, 643, 656, 657, 644
See application file for complete search history.

(56) References Cited

U.S. PATENT DOCUMENTS

| | | | | |
|---|---|---|---|---|
| 3,989,847 | A | 11/1976 | Kurihara et al. | 426/7 |
| 4,741,906 | A | 5/1988 | Paardekooper et al. | 426/59 |
| 5,384,149 | A * | 1/1995 | Lin | 426/646 |
| 6,005,073 | A | 12/1999 | Hultin et al. | 530/412 |
| 6,136,959 | A | 10/2000 | Hultin et al. | 530/412 |
| 6,248,383 | B1 * | 6/2001 | Yoshikawa et al. | 426/332 |
| 6,288,216 | B1 | 9/2001 | Hultin et al. | 530/412 |
| 6,451,975 | B1 | 9/2002 | Hultin et al. | 530/350 |
| 6,797,288 | B1 * | 9/2004 | Monagle et al. | 424/757 |
| 6,855,364 | B1 * | 2/2005 | Kelleher et al. | 426/641 |

FOREIGN PATENT DOCUMENTS

GB 2048051 12/1980

OTHER PUBLICATIONS

Meinke et al., Some Factors Influencing The Production of Protein Isolates From Whole Fish, Journal of Food Science, vol. 37, (1972), pp. 195-198.
Meinke et al., Autolysis as a Factor in the Production of Protein Isolates From Whole Fish, Journal of Food Science, vol. 38, (1973), pp. 864-866.
Onodenalore et al., Journal of Aquatic Food Product Technology, vol. 5 (4) (1996), pp. 43-59.
Chawis et al., Journal of Food Science, vol. 61, No. 2, (1996), pp. 362-266, 371.
Venugopal et al., Thermostable Water Dispersions of Myofibrillar Protein From Atlantic Mackeral, Scomber Scrombus 7) Journal of Food Science, vol. 59, No. 2, (1994), pp. 265-276.
Cuq et al., Edible Packaging Films Based on Fish Myofibrillar Proteins: Formulation and Functional Properties, Journal of Food Science, vol. 60, No. 6, (1996), pp. 1369-1374.
Shahidi et al, Notes and Digests, Meat Focus International-Oct. (1983), pp. 443-445.
FSTA #1, Yang, FSTA AN #95 (02): 50115, 1994.
FSTA #2, Salam, FSTA AN #94 (04): R0024, 1993.
FSTA #3, Han-Ching FSTA AN #94 (04): R0024, 1993.
FSTA #4, Chen, FSTA AN #92 (12): 50138, 1991.
FSTA #5, Liu, FSTA #92 (12): 50137, 1991.
FSTA #6, Pan, FSTA #92 (12): 50136, 1991.
FSTA #7, Yang, FSTA #92 (12): 50118, 1992.
FSTA #8, Kee, FSTA #92 (02): 50122, 1992.
Shahidi et al, "Water Dispersions of Myofibrillar Proteins From Capelin (Mallotus Villosum):", Food Chemistry 53 (1995), pp. 51-54.
Shadi et al, Sollubilization and Thermostability of Water Dispersions of Muscle Structured Proteins of Atlantic Herring (Clupea Horengus), Journal of Agriculture Food Chemistry, vol. 42, No. 7, (1994), pp. 1440-1446.
"Sigma" Catalog, 1995, p. 10.

* cited by examiner

*Primary Examiner*—Anthony Weier
(74) *Attorney, Agent, or Firm*—Paul J. Cook

(57) ABSTRACT

A low cholesterol protein composition derived from animal muscle tissue is provided. The low cholesterol protein composition is added to meat or fish prior to cooking to retain moisture during cooking in the fish or meat.

42 Claims, No Drawings

LOW CHOLESTEROL, FUNCTIONAL, ANIMAL MUSCLE PROTEIN COMPOSITION AND PROCESS

This application claims benefit of provisional application 60/464,614, filed Apr. 23, 2003.

BACKGROUND OF THE INVENTION

This invention relates to a process for making an edible low cholesterol, functional animal muscle protein composition, a process for making the composition and a process of using the composition to retain moisture in cooked food. More particularly, this invention relates to such a protein composition and process that utilizes animal muscle protein to retain moisture in food and to the food product utilized in the process.

Prior to the present invention, protein compositions derived from animal muscle tissue have been available for human consumption as disclosed in U.S. Pat. Nos. 6,005,073; 6,288,216 and 6,451,975 as well as U.S. patent application Ser. No. 10/161,171, filed Jun. 4, 2002. Unfortunately these compositions contain cholesterol, which is believed to be detrimental to heart health. Typical cholesterol concentrations in meat, seafood, poultry and meat products such as bologna or bratwurst range from about 40 mg. to about 130 mgs. per 100 grams of the meat, seafood, poultry or meat product, "Guide to Low Cholesterol Foods", North Central Regional Extension Publication 335, in cooperation with Extension Service, United States Department of Agriculture, March 1995. Presently proposed United States Food and Drug Administration regulations would label a food (a) with fewer than 2 mg. cholesterol per serving as "cholesterol-free", (b) with fewer than 20 mg cholesterol per serving as "low cholesterol" and (c) with at least 75% less cholesterol per serving than the original product, "reduced cholesterol".

In addition, prior to the present invention, it has been known that meat or fish cooked at an elevated temperature loses its moisture to the surrounding atmosphere. In so doing, the cooked meat or fish undesirably loses its natural or added flavors so that it becomes less tasteful. Fluid loss during cooking of meat or fish can range up to 30% to 40% by weight based upon the weight of the meat or fish prior to cooking. A prior solution for retaining moisture in the meat or fish without additives took the form of wrapping the meat or fish in a solid moisture barrier such as aluminum foil. This solution is undesirable since the surface of the meat or fish remains soft rather than having a desirable crust.

Prior attempts to retain moisture in cooked meat or fish with additives have included the use of sodium tripolyphosphate, a coating of fat free flour, based, batter containing an egg white substitute (U.K. Patent Application 2,097,646), water-in-oil emulsion (U.S. Pat. No. 3,406,081), protein or protein isolate and a fat (U.S. Pat. Nos. 4,031,261 and 4,935,251), milk solids (U.S. Pat. No. 2,282,801) and lecithin (U.S. Pat. Nos. 2,470,281 and 3,451,826).

Accordingly, it would be desirable to provide a low cholesterol edible protein composition derived from animal muscle tissue to provide a more healthy food product as compared to the animal muscle tissue containing its original concentration of cholesterol. Furthermore, it would be desirable to provide such a form of fish or meat which is no less nutritional than the original fish or meat to be cooked. In addition, it would be desirable to provide such a form of fish or meat wherein the majority of moisture or added flavors or spices in the uncooked fish or meat is retained during cooking.

SUMMARY OF THE INVENTION

In accordance with this invention, a low cholesterol myosin and actin rich composition derived from animal muscle tissue is provided which is in the form of a "dry protein mixture", an "aqueous acidic protein solution" or a "precipitated solid protein mixture" as defined below. Also, in accordance with this invention, animal muscle tissue to be cooked is coated or admixed or injected with a dry protein mixture, a precipitated solid protein mixture or an aqueous acidic solution of a low cholesterol protein mixture derived from animal muscle tissue comprising a mixture of myofibrillar proteins and sarcoplasmic proteins from a composition obtained by one of the processes disclosed in U.S. Pat. Nos. 6,005,073; 6,288,216; and/or 6,451,975 and/or U.S. patent application Ser. No. 10/161,171, filed Jun. 4, 2002 all of which are incorporated herein by reference in their entirety. The compositions of this invention are obtained from the first aqueous acidic solutions described in U.S. Pat. Nos. 6,005,073; 6,288,216; 6,451,975 and application Ser. No. 10/161,171 by subjecting the first aqueous acidic solution to filtration to form a retentate solution under conditions to retain a low cholesterol protein composition containing myosin protein and actin protein in the retentate and recovering the retentate. The low cholesterol retentate protein composition of this invention contains less than about 50%, preferably less than about 25% and most preferably 0% of the amount of cholesterol contained in the original animal muscle tissue. The retentate solution can be utilized as the aqueous acidic protein solution of this invention. Alternatively, this aqueous acidic protein solution of this invention can be mixed with a base to raise its pH thereby to effect precipitation of the dissolved protein which is then recovered such as by filtration or centrifugation or the like. By the phrase, "dry protein mixture" as used herein is meant a dehydrated, low cholesterol protein mixture of myofibrillar proteins and sarcoplasmic proteins derived from animal muscle tissue and which is obtained from an aqueous acid solution of animal muscle tissue having a pH (less than or equal to pH 3.5 followed by filtration to recover the retentate fraction obtained after filtration. This retentate fraction comprises the low cholesterol aqueous acidic protein solution of this invention. The dry protein mixture also contains less than about 15 weight percent water, preferably between about 3 and 10 weight percent water and most preferably between about 3 and 7 weight percent water based on the total weight of the protein mixture and water. While a dry protein mixture containing 0% water is useful in the present invention, dry powders, in general, containing 0 to 3 weight percent water can be dangerous to process on a commercial scale since they have an explosive nature. Solid mixtures of myofibrillar proteins and sarcoplasmic proteins containing greater than about 15 weight percent water based on total weight of the protein mixture and water are undesirable in this invention since they are microbially unsound.

By the phrase low cholesterol "aqueous acidic protein solution" as used herein is meant a low cholesterol aqueous solution of myofibrillar proteins and sarcoplasmic proteins derived from animal muscle tissue and having a pH of 3.5 or less and preferably between about 2.5 and about 3.5 but not so low as to adversely affect the protein functionality and which is subject to filtration under conditions to retain myosin protein and actin protein in the retentate and to isolate cholesterol in the filtrate. The retentate is recovered as the aqueous acidic protein solution of this invention. The retentate of this invention contains between about 0.5 and about 25 weight percent protein based on the weight of the retentate. The aqueous acidic protein solution can be obtained directly from animal muscle tissue by the processes described below followed by filtration or by dissolving the dry protein mixture in water (previously obtained by filtration) or in a pharmaceutically or food grade acceptable aqueous acidic solution.

By the phrase "precipitated solid protein mixture" as used herein is meant the precipitated protein mixture obtained by mixing a base with the aqueous acidic protein mixture of this invention to raise its pH to between about 4.7 and about 6.1, species dependent. At this higher pH, the protein in solution is precipitated. The precipitated protein mixture is then recovered. A dry powder of low cholesterol protein derived from animal muscle tissue having a pH between about 4.7 and about 7.8, preferably between about 5.5 and about 7.5 can be obtained from the precipitated solid protein mixture by drying and comminuting it. This dry powder retains the functionality of the protein so that it can be formed into a gel. The gel is formed by placing the protein into a chopper that is pre-chilled with ice. One part protein (powder) is mixed with 3.7 parts cold water and two (2%) percent NaCl is added to the chopper. The material is adjusted, if necessary, to pH 6.8–7.4. The material is then chopped between 2–3 minutes. The protein prior to cooking should have a moisture content in the 74–82% range. The chopped, protein paste is placed into a polymeric, e.g. polyethylene bag and all the air is removed by hand pressing. The paste is rolled to a thickness of 3 mm and placed for 25 seconds on high in a microwave oven, and then cooled. The final cooled material is tested for its ability to double-fold and rated on a 5-point scale as described by Kudo et al. (1973, Marine Fish. Rev. 32:10–15). This dry powder or gel can be consumed as human food or it can be mixed with convention food additives such as water binders, nutrients or flavors to produce a human food having a desired taste.

In accordance with this invention for retaining moisture in cooked meat or fish, the precipitated solid protein mixture of this invention or the dry protein mixture of this invention in powder form, dehydrated form or small particulate form is applied to the surface of animal muscle tissue to be cooked or is mixed with the animal muscle tissue (ground, minced as thinly sliced) to be cooked such as hamburger or sausage. Alternatively, the aqueous acidic protein solution of this invention can be injected into the muscle tissue of fish or meat or it can be applied to the surface of the fish or meat or it can be mixed with the fish or meat. The fish or meat containing the low cholesterol dry protein mixture, the low cholesterol precipitated solid protein mixture of the aqueous acidic protein solution then can be cooked at elevated temperature in the absence of a solid moisture barrier while retaining a substantial majority of its original moisture. The difference in weight between meat or fish treated in accordance with this invention compared with fish or meat not injected, mixed or coated with the dry protein mixture or aqueous acidic protein solution is between about 4 and about 21%, more usually, between about 4 and about 10%.

DESCRIPTION OF SPECIFIC EMBODIMENTS

In accordance with this invention, a low cholesterol myosin-rich and actin-rich protein composition derived from animal muscle is provided in the form of a dry protein mixture, an aqueous acidic protein solution or a precipitated solid mixture is provided. In addition, in accordance with this invention, animal muscle tissue to be cooked is coated, admixed and/or injected with a dry protein mixture, or the aqueous acidic protein solution. The composition of this invention comprises a mixture of myofibrillar proteins and sarcoplasmic proteins derived from animal muscle tissue and obtained by the processes disclosed in U.S. Pat. Nos. 6,005,073, 6,288,216, Ser. No. 10/161,171, filed Jun. 4, 2002 and U.S. Pat. No. 6,451,975 in the form of a first acidic solution followed by ultrafiltration of the first aqueous acidic solution to recover the retentate. The retentate is obtained under filtration conditions to recover a protein composition that includes myosin protein and actin protein in the retentate comprising the composition of this invention while cholesterol is concentrated in the filtrate. This dry protein mixture is obtained by one of two processes. In these processes, (acid processes) animal muscle tissue is formed into small tissue particles which are then mixed with sufficient acid to form a solution of the tissue having a pH of 3.5 or less, but not such a low pH as to adversely modify the animal tissue protein, e.g., about 1.0 or less. In one of these two processes, the solution is centrifuged to form a lowest membrane lipid layer, an intermediate layer of aqueous acidic protein solution and a top layer of neutral lipids (fats and oils). The intermediate layer of first aqueous acidic protein solution then is separated from the membrane lipid layer or from both the membrane lipid layer and the neutral lipid layer. In a second of these two processes, the first aqueous acidic protein solution is recovered without a centrifugation step since the starting animal muscle tissue contains low concentrations of undesired membrane lipids, oils and/or fats. In both processes, the protein mixture is free of myofibrils and sarcomeres. In both processes, the first aqueous acidic protein solution is followed by filtration to recover a myosin-rich and actin-rich retentate which comprises the aqueous acidic protein solution of this invention and to isolate cholesterol in the filtrate. The protein in the filtered aqueous acidic protein solution is recovered by drying the aqueous acidic solution; such as by evaporation, spray drying or lyophilization to form the dry protein mixture of this invention having the low pH it had when it was dissolved in the aqueous acidic protein solution. Alternatively, the aqueous acidic protein solution (filtered) can be utilized with the uncooked meat or fish without drying. In another alternative process, the protein in the aqueous acidic protein solution can be precipitated and recovered and mixed with a pharmaceutically acceptable or food grade acid to form an aqueous acidic protein solution of a desired viscosity. This latter alternative process is particularly suitable for forming an aqueous acidic protein solution that can be injected into meat or fish. The recovery of the useful dry protein mixture and aqueous acidic protein solution of this invention provides the process advantages of eliminating the prior art steps of raising the pH of the first aqueous acid protein solution and the required precipitation step. Alternatively, the pH of the aqueous acidic protein solution is raised to a value of between about 4.7 and about 6.1 to effect precipitation of the protein in solution. The precipitated protein then is recovered such as by filtration or centrifugation. The recovered protein then can be mixed with or coated on the fish or meat to be cooked. Alternatively, a dry powder can be formed from the precipitated protein by drying and comminuting it. The dry powder, when mixed with water, has a pH between about 4.7 and about 7.8, preferably between about 5.5 and about 7.5 and can be used to form a gel. The gel is formed by placing the protein into a chopper that is pre-chilled with ice. One part protein (powder) is mixed with 3.7 parts cold water and two (2%) percent NaCl is added to the chopper. The material is adjusted, if necessary, to pH 6.8–7.4. The material is then chopped between 2–3 minutes. The protein prior to cooking should have a moisture content in the 74–82% range. The chopped, protein paste is placed into a polymeric, e.g. polyethylene bag and all the air is removed by hand pressing. The paste is rolled to a thickness of 3 mm and placed for 25 seconds on high in a microwave oven, and then cooled. The final cooled material is tested for its ability to double-fold and rated on a 5-point scale as described by Kudo et al. (1973, Marine Fish. Rev. 32:10-15).

Filtration can be effected by microporous filtration, ultrafiltration or diafiltration. Microporous filtration can be effected with a water wettable microporous membrane such as a membrane designed to retain particles having an average size between about 0.01 and 5 microns. Ultrafiltration can be effected with a water wettable membrane designed to retain particles having an average size between about 0.001 and about 0.02 microns. Diafiltration water wettable membranes are essentially free of pores and, under the process conditions utilized permit passage of water and/or aqueous salt and/or acid solutions through the membrane.

Ultrafiltration is effected with a water wettable ultrafiltration membrane having a molecular weight cut-off which effects retention of myosin heavy chain protein (~205,000 Daltons) and actin protein (~42,000 Daltons). Representative suitable ultrafiltration membranes have a molecular weight cut-off between about 3,000 Daltons and about 100,000 Daltons, preferably between about 10,000 Daltons and about 50,000 Daltons. Ultrafiltration membranes having a molecular weight cut-off above 42,000 Daltons can be utilized to retain myosin and actin since the acidic conditions of the solution cause the protein to unfold thereby promoting their retention by the ultrafiltration membranes. Ultrafiltration can be effected by tangential flow filtration (TFF) with a single pass or with multiple passes over the ultrafilter. The retentate recovered during filtration comprises the low-cholesterol aqueous acidic protein solution of this invention, which can be utilized directly or can be dried to form the dry protein mixture of this invention. The aqueous acidic protein solution of this invention comprising the retentate has reduced water concentrations, and reduced low molecular weight protein concentrations, and lower cholesterol as compared to the first aqueous acidic protein solution which is not filtered. The aqueous acidic protein solution of this invention contains between about 0.5 and about 25 weight percent protein based upon the total weight of the aqueous acidic protein solution. Representative suitable ultrafiltration membranes include, polyethersulfones, polyamides, polycarbonates, polyvinylchloride, polyolefins such as polyethylene or polypropylene, cellulose esters such as cellulose acetate or cellulose nitrate, regenerated cellulose, polystyrene, polyimides, polyetherimides, acrylic polymers, methacrylic polymers, copolymers thereof, blends thereof or the like.

The dry protein mixture or the aqueous acidic protein solution can then be applied to, admixed with and/or injected into the meat or fish. The dry acidic protein mixture or aqueous acidic protein solution can be applied alone or in admixture with conventional food or nutritive additives such as breading or batter coatings, spice dry rubs, cracker meal, corn meal or the like. It is preferred to utilize the aqueous acidic protein solution, with or without food or nutritional additives, for injection. The dry protein mixture and/or aqueous acidic protein solution can be coated on the surface of the meat or fish with an applicator or can be coated by tumbling the meat or fish in the solution or in a marinade containing the acidic aqueous protein solution or dry acidic protein mixture in a tumbling or vacuum tumbling apparatus.

In summary, the dry protein mixture, precipitated solid protein mixture or the aqueous acidic protein solution utilized in the present invention can be obtained by the following methods:

1. Reduce the pH of comminuted animal muscle tissue to a pH less than about 3.5 to form an acidic protein solution, centrifuge the solution to form a lipid-rich phase and an aqueous phase, recovering a first aqueous acidic protein solution substantially free of membrane lipids and filtering the solution to isolate the retentate comprising the aqueous acidic protein solution that can be used in this invention.

2. Spray dry the aqueous acidic protein solution obtained by method 1 to form a dry protein mixture substantially free of membrane lipids that can be used in the present invention.

3. Lyophilize the aqueous acidic protein solution obtained by method 1 to form the dry protein mixture substantially free of membrane lipids that can be used in the present invention.

4. Increase the pH of the aqueous acidic protein solution from method 1 to about pH 5.0–5.5 to effect precipitation of the proteins and then readjust the protein back to a pH of about 4.5 or less using acid in a minimum volume to concentrate the aqueous acidic protein solution to between 3.5–7% protein and filtering the first acidic protein solution to recover the retentate.

5. Reduce the pH of comminuted animal muscle tissue to form a first aqueous acidic protein solution which is filtered to produce the aqueous acidic protein solution that can be used in the present invention.

6. Spray dry the aqueous acidic protein solution obtained by method 5 to form the dry protein mixture of this invention.

7. Lyophilize the aqueous acidic protein solution obtained by method 5 to form the dry protein mixture of this invention.

8. Raise the pH of the aqueous acidic protein solution of methods 1 or 5 to effect precipitation of the proteins and recovering the precipitated solid protein mixture.

The dry protein mixture, aqueous acidic solution and precipitated solid protein mixture of this invention are capable of being formed into a gel. The gel is formed by placing the protein into a chopper that is pre-chilled with ice. One part protein (powder) is mixed with 3.7 parts cold water and two (2%) percent NaCl is added to the chopper. The material is adjusted, if necessary, to pH 6.8–7.4. The material is then chopped between 2–3 minutes. The protein prior to cooking should have a moisture content in the 74–82% range. The chopped, protein paste is placed into a polymeric, e.g. polyethylene bag and all the air is removed by hand pressing. The paste is rolled to a thickness of 3 mm and placed for 25 seconds on high in a microwave oven, and then cooled. The final cooled material is tested for its ability to double-fold and rated on a 5-point scale as described by Kudo et al. (1973, Marine Fish. Rev. 32:10–15).

The protein products utilized in the present invention comprise primarily myofibrillar proteins that also contains significant amounts of sarcoplasmic proteins. The sarcoplasmic proteins in the protein product admixed with, injected into or coated on the animal muscle tissue comprises above about 6%, preferably above about 8%, more preferably above about 12% and most preferably above about 15%, up to about 30% by weight sarcoplasmic proteins, based on the total weight of protein in the dry acidic protein mixture or aqueous acidic protein solution.

In accordance with this invention the dry protein mixture of myofibrillar proteins and sarcoplasmic proteins, in powder form, small coarse particle or dehydrated form of the precipitated solid protein mixture is applied to the surface of animal muscle to be cooked, or is mixed with the animal muscle tissue to be cooked such as hamburger, sliced reformulated beef or sausage. The term "a surface" as used herein is a surface of the fish or meat which is positioned 90 degrees from an adjacent surface or surfaces of the meat or fish. In addition, the term "a surface" can comprise the connecting surface connecting two adjacent surfaces positioned 90 degrees from each other. Preferably, the entire surface of the meat or fish is coated with the dry acidic protein mixture or aqueous acidic protein solution. The coated fish or meat then can be cooked at elevated temperature while retaining a substantial majority of its original moisture.

In one aspect of this invention, particulate meat or fish such as ground meat or fish, e.g. hamburger, is mixed with the dry protein mixture or the precipitated solid protein mixture comprising myofibrillar proteins and sarcoplasmic proteins at a weight ratio usually comprising about 0.4 to about 15% weight of the protein mixture based on the weight of the uncooked meat or fish, preferably between about 0.5 and 5% weight based on the weight of uncooked meat or fish and most preferably comprising between about 0.5 to about 2% weight based on the weight of the uncooked meat or fish. In addition, the aqueous acidic protein solution can be added to the meat or fish in the same ratios based on the weight of protein in the solution. When the dry protein mixture, precipitated solid protein mixture and/or aqueous acidic protein solution is applied to at least one surface of the meat or fish or it is applied by injection, the amount of the protein mixture added is the same weight ratio as set forth above when mixed with ground meat or fish. When utilizing less than about 0.03% weight dry protein mixture, precipitated solid protein mixture or aqueous acidic protein solution, effective moisture retention is not observed. When utilizing greater than about 15% weight dry protein mixture or aqueous acidic protein solution, the cooked meat or fish can become undesirably hard.

The animal muscle tissue which is modified in accordance with this invention comprises meat and fish, including shell fish. Representative suitable fish include deboned flounder, sole, haddock, cod, sea bass, salmon, tuna, trout or the like. Representative suitable shell fish include shelled shrimp, crabmeat, crayfish, lobster, scallops, oysters, or shrimp in the shell or the like. Representative suitable meats include ham, beef, lamb, pork, venison, veal, buffalo or the like; poultry such as chicken, mechanically deboned poultry meat, turkey, duck, a game bird or goose or the like either in fillet form or in ground form such as hamburg. The meats can include the bone of the animal when the bone does not adversely affect the edibility of the meat such as spare ribs, lamb chops or pork chops. In addition, processed meat products which include animal muscle tissue such as a sausage composition, a hot dog composition, emulsified product or the like can be coated, injected or mixed with the dry acidic protein mixture, precipitated solid protein mixture and/or the aqueous acidic protein solution, or a combination of these protein addition methods. Sausage and hot dog compositions include ground meat or fish, herbs such as sage, spices, sugar, pepper, salt and fillers such as dairy products as is well known in the art.

The fish or meat containing the dry protein mixture or aqueous acidic protein solution then can be cooked in a conventional manner such as by baking, broiling, deep fat frying, pan frying, in a microwave oven or the like. It has been found that the cooked meat or fish provided in accordance with this invention weighs between about 4% and about 21%, more usually between about 4% and about 9% by weight greater than cooked untreated meat or fish starting from the same uncooked weight.

By utilizing a filtration in accordance with the present invention, a low cholesterol edible protein composition is obtained without the use of organic solvents such as ethanol or isopropanol to remove cholesterol from the protein. This is advantageous since solvent addition and removal steps need not be conducted and the possibility of degrading the protein or its functionality by solvent addition is eliminated. (Lanier, T. C. 1999, Functional Food Protein Ingredients from Fish, In: Seafood Proteins, Editors: Z. E. Sikorski et al, Chapman and Hall, New York, N.Y., pgs 127–159)

The following examples illustrate the present invention and are not intended to limit the same.

EXAMPLE 1

Ultrafiltration of Myofibrillar & Sarcoplasmic Atlantic Cod Proteins

Fresh Atlantic cod muscle was ground to approximately $\frac{1}{8}^{th}$ inch and placed into a 5000 ml plastic beaker containing 900 ml cold filtered water (Millipore-Milli Dl). The muscle-water mixture was homogenized using a PowerGen 700 homogenizer (Fisher Scientific) on speed 6 for 1 minute. The homogenate was adjusted to pH 2.76 using 2 N hydrochloric acid added drop-wise. The acidified homogenate was centrifuged at 11,000 times gravity force in a Sorvall RC-5B refrigerated centrifuge in a GS-30 rotor for 30 minutes. The protein layer was filtered through four layers of cheesecloth. A 500 ml aliquot was placed into a Millipore Labscale TFF system equipped with a Pellicon XL, PXB050A50, 50,000 KDaltons nominal molecular weight cutoff (NWCO), polyethersulfone ultrafiltration membrane. The unit was run in a concentration mode using a feed pressure of 30 psi and a retentate pressure of 10 psi. The starting material was 2.0 Brix % and had a protein concentration of 16.41 mg/ml. After 6 hours and 12 minutes the retentate material was 6.4 Brix % and had a protein concentration of 54.54 mg/ml. The starting material had a moisture content of 97.9% and a cholesterol value of 55.27 mg/100 g. The retentate had a moisture content of 94.3% and no cholesterol was detected. The methods used were AOAC $15^{th}$ edition 1995. Approximately 25 ml of the retentate was placed in a small plastic dish and microwaved for 15 seconds and cooled. The resultant material was a soft gel with no residual or loose water. The retentate was also injected using a BD 10 ml syringe (18 gauge needle) into uniformly cut chicken breast pieces. In one chicken piece that weighed 22.26 g, cod protein retentate was injected until a weight of 24.27 g. After microwave cooking the cooked piece had a final weight of 22.78 g. In another piece of chicken the initial weight was 18.45 g and it was injected with cod protein retentate until a weight of 19.70 g. After cooking the final weight was 18.73 g.

EXAMPLE 2

Ultrafiltration of Myofibrillar & Sarcoplasmic Pork Proteins

Fresh pork loin muscle was ground to approximately $\frac{1}{8}^{th}$ inch and placed into a 5000 ml plastic beaker containing 900 ml cold filtered water (Millipore-Milli Dl). The muscle-water mixture was homogenized using a PowerGen 700 homogenizer (Fisher Scientific) on speed 6 for 2 minute. The homogenate was adjusted to pH 2.8 using 2 N hydrochloric acid added drop-wise. The acidified homogenate was centrifuged at 11,000 times gravity force in a Sorvall RC-5B refrigerated centrifuge in a GS-30 rotor for 30 minutes. The protein layer was filtered through four layers of cheesecloth. A 500 ml aliquot was placed into a Millipore Labscale TFF system equipped with a Pellicon XL, PXB050A50, 50,000 Daltons NWCO, polyethersulfone ultrafiltration cassette. The unit was run in a concentration mode using a feed pressure of 30 psi and a retentate pressure of 10 psi. The starting material was 1.7 Brix % and had a protein concentration of 18.11 mg/ml. After approximately 12 hours the retentate material was 5.6 Brix % and had a protein concentration of 44.80 mg/ml. The starting material had a moisture content of 98.4% and a cholesterol value of 2.34 mg/100 g. The retentate had a moisture content of 94.9% and no cholesterol was detected. The methods used were AOAC 15$^{th}$ edition 1995. Approximately 20 ml of the retentate was placed in a small plastic dish and microwaved for 30 seconds and cooled. The resultant material was a soft gel with no residual or loose water.

EXAMPLE 3

Ultrafiltration of Myofibrillar & Sarcoplasmic Pork Proteins

Fresh pork loin muscle was ground to approximately 1/8$^{th}$ inch and placed into a 5000 ml plastic beaker containing 900 ml cold filtered water (Millipore-Milli Dl). The muscle-water mixture was homogenized using a PowerGen 700 homogenizer (Fisher Scientific) on highest speed for 1.5 minutes. The homogenate was adjusted to pH 2.9 using 2 N hydrochloric acid added drop-wise. The acidified homogenate was centrifuged at 11,000 times gravity force in a Sorvall RC-5B refrigerated centrifuge in a GS-30 rotor for 30 minutes. The protein layer was filtered through four layers of cheesecloth. A 500 ml aliquot was placed into a Millipore Labscale TFF system equipped with a Pellicon XL, PXB050A50, 50,000 Daltons NWCO, polyethersulfone ultrafiltration cassette. The unit was run in a concentration mode using a feed pressure of 30 psi and a retentate pressure of 10 psi. The starting material was 2.3 Brix % and had a protein concentration of 21.33 mg/ml. After approximately 18 hours the retentate material was 5.3 Brix % and had a protein concentration of 49.97 mg/ml. In the concentrated proteins 18.91 mg/100 g cholesterol was detected. The methods used were AOAC 15$^{th}$ edition 1995.

EXAMPLE 4

Ultrafiltration of Myofibrillar & Sarcoplasmic Pork Proteins

Fresh pork loin muscle was ground to approximately 1/8$^{th}$ inch and placed into a 5000 ml plastic beaker containing 900 ml cold filtered water (Millipore-Milli Dl). The muscle-water mixture was homogenized using a PowerGen 700 homogenizer (Fisher Scientific) on highest speed for 2 minutes. The homogenate was adjusted to pH 2.8 using 2 N hydrochloric acid added drop-wise. The acidified homogenate was centrifuged at 11,000 times gravity force in a Sorvall RC-5B refrigerated centrifuge in a GS-30 rotor for 30 minutes. The protein layer was filtered through four layers of cheesecloth. A 500 ml aliquot was placed into a Millipore Labscale TFF system equipped with a Pellicon XL, PXB100C50, 100,000 Daltons NWCO, polyethersulfone ultrafiltration cassette. The unit was run in a concentration mode using a feed pressure of 30 psi and a retentate pressure of 10 psi. The starting material was 1.9 Brix % and had a protein concentration of 17.35 mg/ml. After approximately 15 hours the retentate material was 5.6 Brix % and had a protein concentration of 52.46 mg/ml. In the concentrated proteins 7.54 mg/100 g cholesterol was detected. The methods used were AOAC 15$^{th}$ edition 1995.

The invention claimed is:

1. A cholesterol-free protein composition isolated from animal muscle tissue, said protein composition capable of being formed into a gel and said protein composition being produced by forming a protein-rich aqueous solution having a pH less than about 3.5, combining a particulate form of said animal muscle tissue with an aqueous liquid composition having a pH less than about 3.5 to dissolve protein from the animal muscle tissue into said solution and wherein the combination of said animal muscle tissue and aqueous liquid composition does not substantially degrade protein of said protein-rich aqueous solution, filtering said protein-rich aqueous solution to form a retentate solution having a pH less than about 3.5 and recovering said retentate solution.

2. A low cholesterol protein composition isolated from animal muscle tissue, said composition less than about 50% of the amount of cholesterol in said animal muscle tissue, said composition capable of being formed into a gel and said protein composition being produced by forming a protein-rich aqueous solution having a pH less than about 3.5 combining a particulate form of said animal muscle tissue with an aqueous liquid composition having a pH less than about 3.5 to dissolve protein from the animal muscle tissue into said solution and wherein the combination of said animal muscle tissue and aqueous liquid composition does not substantially degrade protein of said protein-rich aqueous solution, filtering said protein-rich aqueous solution to form a retentate solution having a pH less than about 3.5 and recovering said retentate solution.

3. A low cholesterol protein composition isolated from animal muscle tissue, said composition less than about 25% of the amount of cholesterol in said animal muscle tissue, said composition capable of being formed into a gel and said protein composition being produced by forming a protein-rich aqueous solution having a pH less than about 3.5 combining a particulate form of said animal muscle tissue with an aqueous liquid composition having a pH less than about 3.5 to dissolve protein from the animal muscle tissue into said solution and wherein the combination of said animal muscle tissue and aqueous liquid composition does not substantially degrade protein of said protein-rich aqueous solution, filtering said protein-rich aqueous solution to form a retentate solution having a pH less than 3.5 and recovering said retentate solution.

4. The composition of any one of claims 1, 2 or 3 substantially free of membrane lipids wherein said protein-rich aqueous solution is centrifuged to form a protein-rich aqueous phase and wherein said protein-rich aqueous phase from said protein-rich aqueous solution is filtered to form the retentate solution and recovering the retentate solution.

5. The composition of any one of claims 1, 2 or 3 wherein the retentate is dried to form a powder.

6. The composition of any one of claims 1, 2 or 3 in the form of an acidic aqueous solution.

7. The composition of claim 4 wherein the retentate is dried to form a powder.

8. The composition of claim 4 in the form of an acidic aqueous solution.

9. The composition of any one of claims 1, 2 or 3 wherein the animal muscle tissue is fish muscle tissue.

10. The composition of claim 4 wherein the animal muscle tissue is fish muscle tissue.

11. The composition of any one of claims 1, 2 or 3 wherein the animal muscle tissue is poultry muscle tissue.

12. The composition of claim 4 wherein the animal muscle tissue is poultry muscle tissue.

13. The composition of any one of claims 1, 2 or 3 wherein the animal muscle tissue is beef muscle tissue.

14. The composition of claim 4 wherein the animal muscle tissue is beef muscle tissue.

15. A process for recovering a low cholesterol protein composition derived from animal muscle tissue which comprises:
    forming a protein-rich aqueous liquid solution having a pH less than about 3.5 combining a particulate form of said animal muscle tissue with an aqueous liquid composition having a pH less than about 3.5 to dissolve protein from the animal muscle tissue into said solution and wherein the combination of said animal muscle tissue and aqueous liquid composition does not substantially degrade protein of said protein-rich aqueous liquid solution,
    centrifuging said protein-rich aqueous liquid solution, to form a protein-rich aqueous phase and a non-aqueous phase and a non-aqueous phase containing membrane lipids,
    recovering said protein-rich aqueous phase,
    filtering said protein-rich aqueous phase to form a retentate having a pH less than about 3.5 and containing myosin protein and actin protein containing less than about 50% of the amount of cholesterol in said animal muscle tissue and a filtrate containing cholesterol and recovering said retentate.

16. The process of claim 15 including the step of drying said retentate.

17. The process of claim 15 wherein said pH of said protein-rich aqueous liquid solution is between 2.5 and about 3.5 and the pH of said retentate is between 2.5 and 3.5.

18. The process of any one of claims 15, 16 or 17 wherein the animal muscle tissue is fish muscle tissue.

19. The process of any one of claims 15, 16 or 17 wherein the animal muscle tissue is poultry muscle tissue.

20. The process of any one of claims 15, 16 or 17 wherein the animal muscle tissue is beef muscle tissue.

21. The process of any one of claims 15, 16 or 17 wherein the animal muscle tissue is pork muscle tissue.

22. The process for retaining moisture in uncooked animal muscle tissue during cooking of the animal muscle tissue which comprises:
    (a) adding to said uncooked animal muscle tissue a low cholesterol protein mixture obtained from animal muscle tissue by dissolving said tissue in an aqueous acid solution having a pH less than about 3.5 or less to form a first aqueous acidic protein solution and filtering said first aqueous acidic protein solution to form a retentate having a pH less than 3.5 containing myosin and actin, said low cholesterol protein mixture being selected from the group consisting of dry protein mixture of myofibrillar proteins and sarcoplasmic proteins derived from animal muscle tissue and from said retentate, a precipitated solid protein mixture derived from animal muscle tissue and from said retentate, and an aqueous acidic protein solution of myofibrillar proteins and sarcoplasmic proteins derived from animal muscle tissue and comprising said retentate and mixtures thereof by an adding method selected from the group consisting of applying said protein mixture to at least one surface of said uncooked animal muscle tissue, mixing said protein mixture with said uncooked animal muscle tissue, injecting said protein mixture into said uncooked animal muscle tissue and a combination of at least two of said adding methods
    and (b) cooking said mwooked animal muscle tissue and protein mixture from step (a).

23. The process of claim 22 wherein the low cholesterol protein mixture of myofibrillar proteins and sarcoplasmic proteins is applied to at least one surface of uncooked animal muscle tissue.

24. The process of claim 22 wherein the low cholesterol protein mixture of myofibrillar proteins and sarcoplasmic proteins is applied to all surfaces of uncooked animal muscle tissue.

25. The process of claim 22 wherein the low cholesterol protein mixture of myofibrillar proteins and sarcoplasmic proteins is mixed with said uncooked animal muscle tissue.

26. The process of claim 22 wherein the low cholesterol protein mixture of myofibrillar proteins and sarcoplasmic proteins is injected into said uncooked animal muscle tissue.

27. The process of any one of claims 22, 23, 24, 25 or 26 wherein said uncooked animal muscle tissue is fish muscle tissue.

28. The process of any one of claims 22, 23, 24, 25 or 26 wherein said uncooked animal muscle tissue is shell fish muscle tissue.

29. The process of any one of claims 22, 23, 24, 25 or 26 wherein said uncooked animal muscle tissue is poultry muscle tissue.

30. The process of any one of claims 22, 23, 24, 25 or 26 wherein said uncooked animal muscle tissue is meat muscle tissue.

31. The process of any one of claims 22, 23, 24, 25 or 26 wherein said uncooked animal muscle tissue is fish muscle tissue.

32. The process of any one of claims 22, 23, 24, 25 or 26 wherein said protein mixture is derived from poultry muscle tissue.

33. The process of any one of claims 22, 23, 24, 25 or 26 wherein said protein mixture is derived from meat muscle tissue.

34. The process of any one of claims 22, 23, 24, 25 or 26 wherein said Jow cholesterol protein mixture is included in a sausage composition.

35. The process of any one of claims 22, 23, 24, 25 or 26 wherein said low cholesterol protein mixture is included in a hot dog composition.

36. A process for recovering a low cholesterol protein composition derived from animal muscle tissue which comprises:
    forming a protein-rich aqueous liquid solution having a pH less than about 3.5 combining a particulate form of said animal muscle tissue with an aqueous liquid composition having a pH less than about 3.5 to dissolve protein from the animal muscle tissue into said solution and wherein the combination of said animal muscle tissue and aqueous liquid composition does not substantially degrade protein of said protein-rich aqueous liquid solution,
    centrifuging said protein-rich aqueous liquid solution, to form a protein-rich aqueous phase and a non-aqueous phase and a non-aqueous phase containing membrane lipids, filtering said protein-rich aqueous phase to form a retentate solution having a pH less than 3.5 containing myosin protein and actin protein containing less than about 50% of the amount of cholesterol in said animal muscle tissue and a filtrate containing cholesterol and recovering said retentate solution.

37. The process of claim 36 including the step of drying said retentate.

38. The process of claim 36 wherein said pH of said protein-rich aqueous liquid solution is between 2.5 and about 3.5.

39. The process of any one of claims 36, 37 or 17 wherein said animal muscle tissue is fish muscle tissue.

40. The process of any one of claims 36, 37 or 38 wherein said animal muscle tissue is poultry muscle tissue.

41. The process of any one of claims 36, 37 or 38 wherein said animal muscle tissue is beef muscle tissue.

42. The process of any one of claims 36, 37 or 38 wherein said animal muscle tissue is pork muscle tissue.

* * * * *

UNITED STATES PATENT AND TRADEMARK OFFICE
CERTIFICATE OF CORRECTION

PATENT NO. : 7,033,636 B2
APPLICATION NO. : 10/827646
DATED : April 25, 2006
INVENTOR(S) : Stephen D. Kelleher It is certified that error appears in the above-identified patent and that said Letters Patent is hereby corrected as shown below:

Col. 10, LN 25, Claim 2, line 2, after "composition" insert --containing--.

Col. 10, LN 40, Claim 3, line 2, after "composition" insert --containing--.

Col. 11, LN 27, Claim 15, line 15, delete "and a non-aqueous phase".

Col. 12, LN 8, Claim 22, next to last line, replace, "mwooked" with --uncooked--.

Col. 12, LN 37-39, Delete Claim 31.

Col. 12, LN 46, Claim 34, line 2, replace "Jow" with --low--.

Col. 12, LN 66, Claim 36, line 15, delete "and a non-aqueous phase".

Signed and Sealed this

Eleventh Day of July, 2006

JON W. DUDAS
*Director of the United States Patent and Trademark Office*